Dec. 5, 1961  C. C. PALMER ET AL  3,011,856
AUTOMATIC PLOTTER
Filed Sept. 28, 1956  3 Sheets-Sheet 1
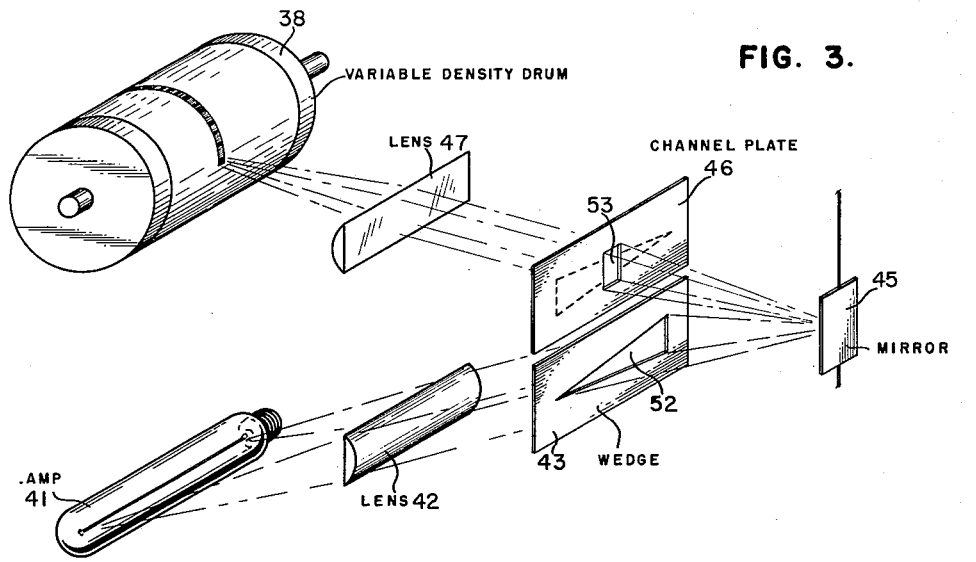
FIG. 3.
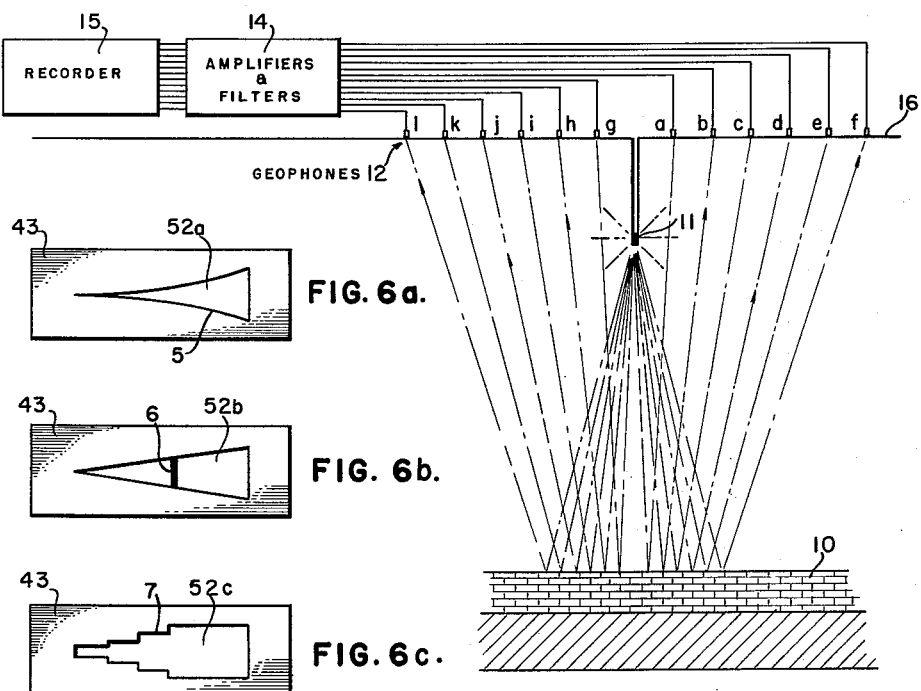
FIG. 6a.
FIG. 6b.
FIG. 6c.
FIG. 6d.
FIG. 1.
INVENTORS.
Carl C. Palmer,
BY Raymond R. Bristow,
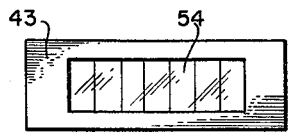
ATTORNEY.

INVENTORS.
Carl C. Palmer,
Raymond R. Bristow,
BY
John A. Schneider
ATTORNEY.

United States Patent Office 3,011,856
Patented Dec. 5, 1961

3,011,856
AUTOMATIC PLOTTER
Carl C. Palmer and Raymond R. Bristow, Houston, Tex., assignors, by mesne assignments, to Jersey Production Research Company, Tulsa, Okla., a corporation of Delaware
Filed Sept. 28, 1956, Ser. No. 612,608
6 Claims. (Cl. 346—109)

This invention is directed generally to an automatic seismic cross-section plotter. More particularly, this invention is directed to a seismic section camera for producing various kinds of seismic traces including traces of variable density and traces of variable color. The invention is also directed to apparatus for preparing a seismic cross-section on photographic recording media from either corrected or uncorrected seismic information with the cross-section record being of types such as variable density or variable color or "wiggly trace" or other types.

As is well known in geophysical prospecting, a seismic shock is imparted to the earth generally by means of an explosion. Seismic waves generated by the explosion travel downwardly through the subsurface and these waves are reflected back to the surface by subterranean strata. These waves are detected at spaced points on the earth's surface, these points being at selected distances from the explosion point, termed the "shot" point. The depths of subsurface reflecting strata can be determined by measuring the time intervals between initiation of the explosion and detection of the reflected waves at the detection points. Various corrections may be made to adjust the arrival times of the reflected waves to compensate, for example, for differences in elevation of the shot point and the various detecting points and to compensate for the "low velocity layer" of the earth at the several points.

By placing the shot point and associated detecting points in different selected areas on the surface of the earth, recording a record for each area and placing these records side by side, a large cross-section of the subsurface is obtained. The electrical signals generated in response to seismic wave energy may be recorded photographically or electrically. One example of electrical recording is recording on a magnetic medium. This type record is not visual; however, it is readily adapted to reproduction. When such a record is reproduced or "played back" the various time correction mentioned above may be applied to the various signals comprising the record. Also, this type record permits repeated reproduction. Records produced on photographic media are desirable, on the other hand, because these records may be visually studied.

The reflected waves picked up by any one of the detectors are of varying amplitudes, and so the signal put out by the detector is also of varying amplitude. This signal may be recorded without any change in form, to give the conventional, or "wiggly trace" type recording. Or, in order to present a more informative "picture" of the subsurface, the varying amplitude of the signal may be presented on the recorded trace by varying the density or by varying the color of the trace.

Having briefly related the present state of the art in the above discussion, the objectives of the present invention follow:

One object of this invention is to provide aparatus for presenting improved variable density and variable color photographic records.

Another object of this invention is to provide apparatus whereby a large cross-section of the subsurface is automatically plotted.

A further object of this invention is to provide apparatus for recording original uncorrected seismic signals, correcting the signals, playing back the corrected signals and recording the corrected signals photographically in variable density or variable color form or in "wiggly trace" form.

An additional object of this invention is to provide apparatus for synchronizing the playback apparatus and the recording apparatus in order to properly align the various records constituting a full seismic cross-section.

These and other objects of this invention will be apparent from the description of the invention which follows:

Briefly, one aspect of this invention comprises a seismic camera adapted to record, photographically, seismic wave energy reflected from the reflecting subsurfaces including a light-sensitive medium, a light source and reflecting means movable in response to electrical signals generated in response to seismic wave energy; means are provided positioned between the light source and the reflecting means adapted to transmit a selected area of light to the reflecting means; channeling means is positioned between the reflecting means and said light-sensitive medium adapted to transmit a selected portion of the reflected area of light and focusing means is provided positioned between the light-sensitive means and the channeling means adapted to condense the selected portion of light. The means for transmitting the area of light may comprise a plate member provided with an opening of generally tapering configuration or the means for transmitting an area of light may comprise a plate member providing an opening, the opening being covered with a transparent medium of varying colors.

Another aspect of this invention relates to a variable density or variable color type camera, as noted above. However, in this embodiment a plurality of reflecting means are employed and channeling means is provided to isolate the light reflected from each of the reflecting means into separate channels.

In another aspect, this invention comprises mounting the optical section of a seismic camera for longitudinal movement along the length of a photographic type recording drum, whereby a full cross-section of the subsurface is obtained on one recording medium. Additionally, this invention encompasses employing the large cross-section type camera which includes an optical section and a drum, in conjunction with a playback drum on which a reproducible magnetic record is placed and which has means whereby corrections may be applied to the record on playback. Additionally, this invention encompasses various apparatuses for synchronizing the drums, for applying time signals to the photographic record, and for preventing double exposure of the photographic medium.

For a more complete description of the invention, reference is now made to the figures wherein:

FIG. 1 is a schematic showing of a profile of the earth's subsurface and the manner in which the original signals are obtained;

FIG. 3 is a schematic representation of the variable density camera;

FIG. 4 is a sectional view of the phase-shifter assembly shown in FIG. 2;

FIG. 5 is a view taken on line 5—5 of FIG. 4; and

FIG. 6 is a schematic representation of a new camera for obtaining a large cross-section of the conventional "wiggly trace" type presentation.

Figure 2:
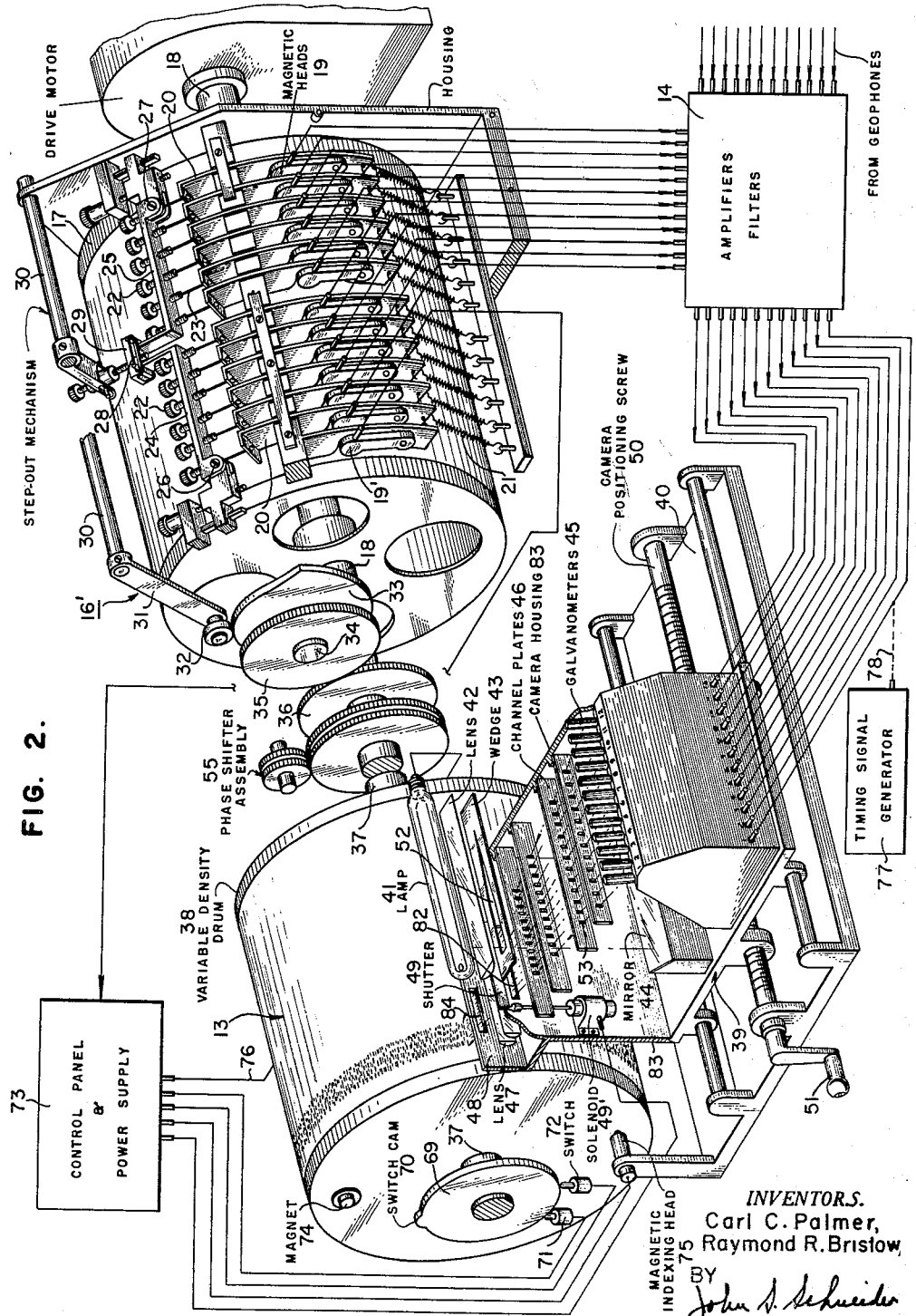
FIG. 2 is a schematic representation of a new camera for obtaining a large cross-section of the variable density or variable color type presentation, and a playback drum.
Figure 2:
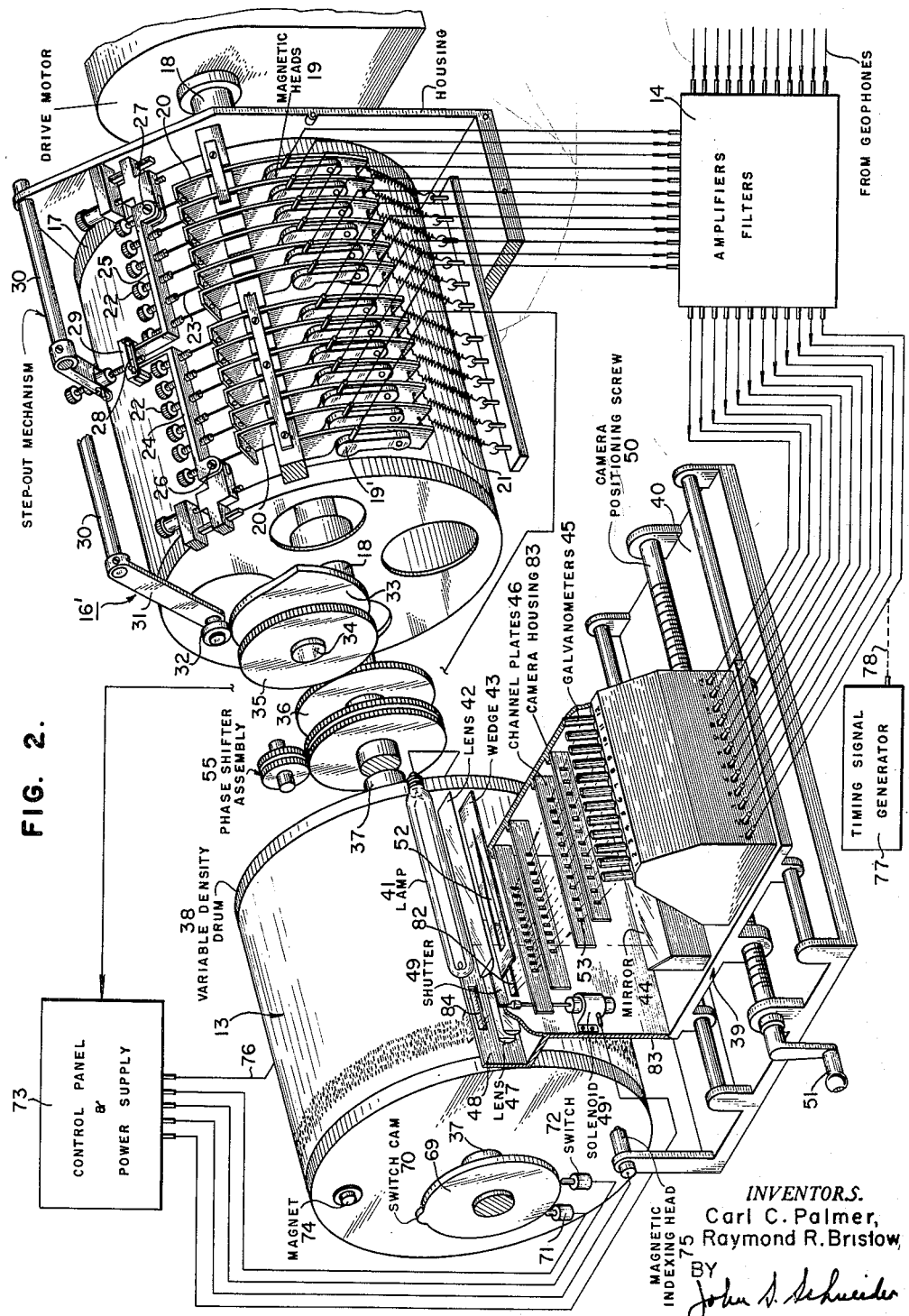

FIGS. 6a 6b, and 6c show several means for effecting a variable density representation.

FIG. 6d shows a means for effecting a variable color representation.

Referring more particularly to the drawing, FIG. 1 shows a reflecting subsurface 10, a shot point 11, and pickups 12–a through 12–l. These pickups are transducers (generally geophones) adapted to translate the reflected shock waves resulting from the explosion at shot point 11, whose paths are designated by the arrowed lines, into electrical signals. These electrical signals from the geophones 12–a through 12–l are conducted by means of electrical conductors to amplifiers and filters designated at 14 and the amplified and filtered electrical signals are conducted then to a recorder 15.

The surface of the earth 16, although shown as flat, may be actually of different elevations and hence the elevations of the various geophones 12–a through 12–l may vary. Corrections must be made for these various differences in height between the respective pickups. Also, there is a low velocity layer of the earth which is the upper portion of the earth extending from about 50 feet to 100 feet below the surface. The low velocity layer consists of relatively unconsolidated material in which seismic velocity is low and highly inconsistent and variable. Thus, a low velocity time correction, as determined from the direct up-hole time of the seismic waves, must also be applied. This reduces the time on the record to correspond to some arbitrary time datum plane below the low velocity layer. The corrections for elevational differences of the pickups and the corrections necessitated for the low velocity layer are constant corrections. That is, they do not vary along the record.

The waves which travel downwardly and are reflected by the various reflecting subsurfaces are first detected by the pickups nearest the shot point. As the distance from the shot point along the surface to each geophone is increased, the time interval required for a reflected wave to reach each successive pickup is increased, even for a bed or subsurface with no dip as shown in FIG. 1. Hence, looking at the right hand side of shot point 11 in FIG. 1, waves reflected from subsurface 10 are first detected by geophones 12–a then an interval of time later by geophones 12–b and then successively by geophones 12–c, 12–d, 12–e and 12–f. Waves are also transmitted directly along the surface of the earth 16 and are detected successively by the geophones 12–a through 12–f. The action is the same for the geophones 12–g through 12–l shown on the left hand side of shot point 11 in FIG. 1. A time-distance curve can be plotted corresponding to the waves reflected from various reflecting subsurfaces. Since it is desired that the shape of the time curve depend only on the depth of the reflecting surface, and not on the distance of the pickups from the shotpoint, corrections must be applied to the reflection times corresponding to the various pickups, this correction factor for each pickup being the additional travel time of the seismic wave to this pickup over the time for the seismic wave to travel directly downward to the reflecting bed and back to the shot point 11. This correction is generally termed a "step-out" or "spread" correction. This correction is not a constant correction but continuously decreases as the travel time of the wave increases. Obviously, little or no correction is needed for very deep reflections whereas large corrections may be necessary for the near surface reflections. A thorough discussion of this type correction is found in patent application Serial No. 513,854 by Charles H. Carlisle, Frank L. Chalmers and James A. Smith entitled "Automatic Plotter," filed June 7, 1955.

FIG. 2 illustrates the variable density camera and a playback drum. In FIG. 1 a signal from the amplifiers and filters 14 is shown conducted to recorder 15. The original signal may be recorded on a magnetic tape for subsequent playback by such apparatus, generally designated 16', or the signal may be conducted directly to the camera apparatus generally designated 13. The device 16' comprises a drum 17 rotatably mounted on a shaft 18 suitably supported and driven by a suitable prime mover. The drum 17 has circumferentially arranged thereon a magnetizable medium upon which the original electrical signals conducted from amplifiers and filters 14 are recorded. The magnetic medium is magnetized proportionately to the amplitudes of each of the seismic waves picked up by geophones 12–a through 12–l. A plurality of magnetic heads, designated 19, are pivotally mounted upon slide bars 20 and biased downwardly by springs 21. Bars 20 are connected to adjusting members 22 by means of wires 23. Adjusting members 22 are connected to ratio bars 24 and 25 which are pivotally mounted at 26 and 27, respectively, and ride in a slot 28 formed in a bar actuating member 29. Bar actuator member 29 is adjustably mounted on a longitudinally extending rod 30 which is secured to a cam rider arm 31 provided with a roller 32 adapted to ride the surface of a generally cylindrically configured cam 33 which is mounted upon a shaft 34 on which is arranged a gear 35 which meshes with a gear 36 arranged on shaft 18. A more detailed description of drum 17 and the associated correction apparatus is found in the above-noted application Serial No. 513,854 by Carlisle et al., entitled "Automatic Plotter," filed June 7, 1955. An additional magnetic head 19' is mounted adjacent the drum and electrically connected to control panel 73 as designated by the broken, arrowed line extending therebetween.

The variable density or variable color camera 13 is mounted adjacent the re-recording apparatus and, as shown, includes a shaft 37 upon which a rotatable drum 38 is mounted. A light-sensitive medium which may be conventional black and white photographic film or color film is circumferentially arranged on drum 38. The optical section of the camera, generally designated 39, is arranged in a housing 83 which is movably mounted on a supporting structure 40. This section includes a lamp 41, a collimating lens 42, a wedge or plate member 43, a reflecting mirror 44, a plurality of mirror galvanometers 45, a plurality of channel plates 46, lenses 47, an additional plate member 48 and a shutter member 49. A positioning screw 50, provided with a handle 51, is employed for moving the section 39 longitudinally of drum 38.

A simplified showing of the optical system is seen in FIG. 3. Lamp or light source 41 is positioned to project light through lens 42 which collimates the light transmitted from lamp 41. A plate member 43 is formed to provide an opening 52 which projects, upon the mirror galvanometer 45, an area of light configured as the opening 52 in plate member 43. This area of light is reflected to channel member 46 which is provided with a constant width opening 53 which is adapted to transmit a selected portion of the area of light reflected from the mirror galvanometer 45 to a focusing lens 47 which is adapted to condense the light to a line of selected width on the photographic medium arranged on drum 38.

FIGS. 6a through 6d illustrate various types of wedge members which may be substituted for the wedge member 43. FIGS. 6a through 6c disclose openings 52a and 52c of generally tapering configuration. FIG. 6d, on the other hand, shows a constant width opening over which a transparent medium 54 of varying colors is provided. The periphery 5 of opening 52a is formed to provide two curved sides. Triangularly configured opening 52b is provided with a marker 6 indicating zero amplitude. The periphery 7 of opening 52c is formed to provide two stepped sides.

Referring again to FIG. 2, shaft 37 of drum 38 has mounted thereon a switch cam 69 provided with a protuberance 70. Two microswitches 71 and 72 are arranged adjacent cam 69 and are electrically connected to a control panel and power supply designated 73. Drum 38 is also provided with a magnet 74, and support 40 has mounted thereon a magnetic indexing head 75 which is arranged adjacent drum 38 and is also electrically connected to the control 73. A solenoid 49' is connected to shutter 49 and electrically connected to control panel 73. Control panel 73 is also connected to lamp 41 by means of a conductor 76.

A timing signal generator 77 is shown connected, by means of dotted line 78, to one of the conductors leading from the amplifiers and filters 14 to one of the mirror galvanometers 45 associated therewith.

Drums 17 and 38 are interconnected by means of a phase-shifter assembly generally designated 55 and more clearly shown in FIGS. 4 and 5. The phase shifter is employed to move drum 31 relative to drum 17. As seen more clearly in FIG. 4, a spur gear 56 is mounted for rotation on shaft 37 and a spur gear 57 is mounted for rotation with shaft 18 through the connecting housing 65. Two pinion gears 58 and 59 are mounted in side by side relation and interconnected by means of a bolt shaft 60 screw-threadedly connected to a housing 61 mounted for rotation with spur gear 56. Pinion gears 58 and 59 mesh with spur gears 56 and 57, respectively. However, pinion gear 58 has one less tooth than pinion gear 59. A housing 62 is mounted adjacent spur gear 57 and is secured thereto by means of screws 63. Housings 61 and 62 are secured together by cap screws 62'. As seen more clearly in FIG. 5, spur gear 57 is provided with a suitable time scale 64 and housing 62 is provided with scale indexing means 64'.

A camera, similar to that illustrated in FIG. 2, is shown in FIG. 6. Herein the optical section generally designated 80 is movably mounted on support 40 by means of positioning screw 50 provided with handle 51. A lamp 81 provides a source of light which is projected onto mirror 44 and reflected to mirror galvanometers 45 from which the light is reflected through openings 82 and 84 in housing 83 and lenses 47. Shutter 49 is positioned between opening 82 and mirror galvanometers 45 and condensing lenses 47 are positioned between the drum 38 and the opening 82. Cam 69 and microswitches 71 and 72 electrically connected to control panel 73 are the same as in the embodiment of FIG. 2. Also, magnet 74, magnetic indexing head 75 and solenoid 49' electrically connected to control panel 73 are the same as in FIG. 2. A lamp 85 is electrically connected to a timing signal generator 86 and a mirror 87 is positioned in housing 83 below lamp 85.

Although two lenses 47 are shown in both the FIG. 2 and the FIG. 6 embodiments, only one would be necessary if such lens had the desired focal length. However, a larger physical size would be required, hence, in practice two lenses are employed instead of one.

In operation, an explosive is detonated at shot point 11 and the resultant shock waves travel downwardly and are reflected from a reflecting subsurface stratum 10 as shown by the arrowed lines in FIG. 1. The spaced geophones 12–a through 12–l pick up the shock waves at the surface of the earth 16 and translate the shock waves into electrical signals which are conducted to amplifiers and filters 14. The amplified and filtered electrical signals may then be transmitted directly to mirror galvanometers 45 or the electrical signals may be placed on a magnetizable medium, such as magnetic tape, and later placed on the playback drum 17 shown in FIG. 2. In the instance wherein the signal is conducted directly to the camera of FIG. 2 or the camera of FIG. 6, the signal passes to the galvanometer mirrors 45 causing the mirrors to move an amount proportional to the amplitude of the signal. In the FIG. 2 embodiment light source 41 transmits a beam of light through collimating lens 42; thence the beam passes through wedge member 43. An area of light identical to the area of the opening 52 is then transmitted to the mirror 44 and reflected to the galvanometer mirrors 45. These in turn reflect the area of light through openings 53 in the channel plates 46. The channel plates 46 are so positioned and the openings 53 so cooperate as to isolate the individual channels of light reflected from each of the galvanometer mirrors 45 to thereby record individual constant width lines on the light sensitive medium or film.

If desired, and as explained with reference to FIG. 3, various type wedges having tapering openings may be substituted or a color plate of varying colors may be employed instead.

When the drum has completed a revolution and one record has been photographically recorded thereon, the optical section 39 is moved longitudinally along the length of the drum by means of crank 51 and positioning screw 50. In the meantime, the geophones and shot point are moved, the explosive is detonated and a new record is obtained on the photographic or light-sensitive medium adjacent the previously recorded record. By this means a full or large cross-section of the subsurface can be obtained.

Microswitches 71 and 72, operating in conjunction with switch cam 69 and solenoid 49', are adapted to prevent double exposure of the film. When drum 38 is rotated by means of the prime mover, not shown, switch cam 69 is rotated causing protuberance 70 to actuate microswitch 72 which, in turn, actuates solenoid 49' to move shutter 49 upwardly to permit light to pass through openings 82 and 94 to start photographic recording on drum 38. When protuberance 70 actuates microswitch 71, solenoid 49' is actuated to move shutter 49 downwardly to interrupt the path of light through opening 82 and the photographic recording is stopped although drum 38 may continue rotating. Simultaneous with the actuation of solenoid 49', lamp 41 is lighted and turned off upon actuation of microswitches 72 and 71, respectively. A timing signal generator 77 is connected to one of the galvanometer mirrors 39. This timing signal generator 77 supplies a pulse periodically which moves an end mirror galvanometer 45 to record time signals on the light-sensitive medium. The particular electrical circuit for effecting this operation is not shown.

The embodiment of FIG. 6 operates similarly. However, to provide the time lines on the photographic medium, a lamp 85 is turned on and off periodically by a timing signal generator 86.

When the variable density camera of FIG. 2 or the "wiggly trace" camera of FIG. 6 is employed in conjunction with the "play-back" apparatus, it is necessary that drums 38 and 17 be aligned in such a way during the playback of each successive record that the shot-break pulses on the successive records are all perfectly aligned on the cross-section produced on drum 38. Proper alignment of the drums prior to the re-recording of each successive record is accomplished by means including the phase-shifter assembly designated 50 and shown more particularly in FIGURES 4 and 5. A magnetic head 19' is provided on drum 16 for detaching the shot-break pulse on the seismogram being played back. This head is electrically connected to an electronic counter contained in the control panel 73. The magnetic indexing head 75, which is connected to drum 31, is also electrically connected to the counter. Prior to the actual re-recording of the seismogram, the drums are rotated in unison and the shot-break pulse on the magnetized record on drum 17 is picked up by the head 19' for transmission to the electronic counter; similarly, at the instant when magnet 74 passes by the magnetic indexing head 75, a second pulse is transmitted to the electronic counter. The electronic counter measures the time difference, either positive or negative, between the reception of the shot-break pulse and the second pulse. A time scale is on scale 64 (FIGURE 5). By reference to this scale, the drum 38 can be shifted (by means of phase shifter 50) the amount that is necessary to have these two pulses arrive simultaneously at the electronic counter. To do this, screws 63 are loosened and shaft 18 connected to drum 17 is held fixed while housing 62 is turned. Pinion gear 59 is thereby turned circumferentially on the stationary spur gear 57. This causes the other pinion gear 58, which has one less tooth, to turn the movable spur gear 56, which is connected to shaft 37. Thus, drum 38 may be shifted relative to the re-recording drum 17. The amount of the shifting can be scaled by means of scale 64 and pointers 64'.

This type of phase shifter can be operated only when the drums are not rotating. However, it is within the scope of this invention to automatically shift the rotation of the drums while they are rotating.

The constant corrections are applied to the record on the magnetizable medium on drum 17 by adjusting the magnetic heads relative to each other by means of adjusting members 22. The variable stepout correction is applied by means of cam 33 and its associated structure. Gear 36 rotates with shaft 18 causing rotation of gear 35 thereby rotating cam 33. Rotation of cam 33 moves lever arm 31 which rotates rod 30 thereby moving the member 29 upwardly or downwardly. Such movement pivots rods 24 and 25 on pivots 26 and 27, respectively, thereby applying the variable correction to the record. As noted supra, this operation is fully described in the cited application.

When the "play back" drum 17 is employed in conjunction with the camera drums 38, the optical sections 39 or 80 are moved along drums 38 until a full or large cross-section of the subsurface has been recorded. As each seismogram corresponding to different shot points is played back, a photographic record is made on drums 38 adjacent a previously played-back record.

In order to present the invention in understandable and simplified form, some structural elements have been omitted. Actually, the apparatus is enclosed in suitable housings. Obviously, the camera apparatuses of FIGS. 2 and 6 must be contained in light sealed housings to prevent undesired exposure of the light-sensitive media.

In one manner of geophysical prospecting, the seismic wave detectors are placed at relatively large distances from the shotpoint in order to detect seismic wave energy refracted (rather than reflected) from subsurface strata. Such refracted energy is recorded in the same manner as reflected energy. Therefore, although, the structure and operation of our invention has been described with reference to reflected energy, it is to be understood that refracted seismic energy recording is within the scope of our invention.

Having fully described the nature, objects and operation of our invention, we claim:

1. A system for photographically recording seismic wave energy reflected from reflecting subsurfaces comprising a light sensitive recording medium movable in one direction; a light source, a plurality of reflecting means each pivotal on an axis extending in a direction parallel to said one direction in response to electrical signals generated in response to seismic wave energy adapted to reflect light transmitted from said light source to said recording medium; means provided with an opening varying in width in a direction transverse to said one direction positioned between said light source and said reflecting means; at least two spaced-apart channel plates positioned between said reflecting means and said recording medium, each of said plates being provided with a plurality of openings, each of said openings being constant in width in a direction transverse to said one direction, said constant width openings being arranged relative to each other including being aligned in series in adjacent plates such that light reflected from each of said reflecting means to said recording medium is channeled along separate isolated paths; said light source, said variable width opening means, said reflecting means, and said channel plates being positioned relative to each other such that an image of said variable area opening is transmitted to each of said reflecting means from said variable width opening means and from each of said reflecting means to said channel plates, each series of openings passing varying amounts of light of constant width to said recording means depending on the pivotal position of the reflecting means associated therewith to produce a plurality of visual, variable density recordings of said seismic wave energy.

2. A system as described in claim 1 including a rotatable drum on which said light sensitive recording medium is arranged; focusing means positioned between said channel plates and said drum adapted to condense each of said channeled areas of light, the combined width of said channels of light extending along only a portion of the length of said drum; said light source, said reflecting means, said variable width opening means, and said channel plates comprising an optical section; and means connected to said optical section adapted to move said optical section along the length of said drum.

3. A system as described in claim 2 including means positioned between said channel plates and said drum adapted to interrupt said channels of light and means operatively connected to said drum adapted to actuate said light interruption means in response to rotation of said drum.

4. A system for photographically recording seismic wave energy reflected from reflecting subsurfaces comprising a light sensitive recording medium movable in one direction; a light source, a plurality of reflecting means each pivotal on an axis extending in a direction parallel to said one direction in response to electrical signals generated in response to seismic wave energy adapted to reflect light transmitted from said light source to said recording medium; means provided with a plurality of different colors varying in a direction extending transverse to said one direction positioned between said light source and said reflecting means; at least two spaced-apart channel plates positioned between said reflecting means and said recording medium, each of said plates being provided with a plurality of openings, each of said openings being constant in width in a direction transverse to said one direction, said constant width openings being arranged relative to each other including being aligned in series in adjacent plates such that light reflected from each of said reflecting means to said recording medium is channeled along separate isolated paths; said light source, said variable color means, said reflecting means, and said channel plates being positioned relative to each other such that said plurality of colors are transmitted to said reflecting means from said variable color means and from said reflecting means to said channel plates, each series of openings passing a selected color of light of constant width to said recording means depending on the pivotal position of said reflecting means to produce visual, variable color recordings of said seismic wave energy.

5. A system as described in claim 4 including a rotatable drum on which said light sensitive recording medium is arranged; focusing means positioned between said channel plates and said drum adapted to condense each of said channeled light colors, the combined width of said channels of light extending only along a portion of the length of said drum; said light source, said reflecting means, said variable color means, and said channel plates comprising an optical section; and means connected to said optical section adapted to move said optical section along the length of said drum.

6. A system as described in claim 5 including means positioned between said channel plates and said drum adapted to interrupt said channels of light and means operatively connected to said drum adapted to actuate said light interruption means in response to rotation of said drum.

References Cited in the file of this patent

UNITED STATES PATENTS

| | | |
|---|---|---|
| 1,906,476 | Marcellus et al. | May 2, 1933 |
| 2,061,016 | Walton | Nov. 17, 1936 |
| 2,096,082 | Beatty | Oct. 19, 1937 |
| 2,165,777 | Batsel | July 11, 1939 |
| 2,186,157 | Van Leer | Jan. 9, 1940 |
| 2,271,980 | Kellogg | Feb. 3, 1942 |
| 2,389,828 | Swift | Nov. 27, 1945 |
| 2,426,367 | Maurer | Aug. 26, 1947 |

(Other references on following page)

UNITED STATES PATENTS

| | | |
|---|---|---|
| 2,463,534 | Hawkins | Mar. 8, 1949 |
| 2,496,392 | Hasbrook | Feb. 7, 1950 |
| 2,517,659 | Greenberg | Aug. 8, 1950 |
| 2,540,105 | Dunbar et al. | Feb. 6, 1951 |
| 2,587,219 | Rettinger | Feb. 26, 1952 |
| 2,615,778 | Butz | Oct. 28, 1952 |
| 2,620,890 | Lee et al. | Dec. 9, 1952 |
| 2,671,375 | Boucher | Mar. 9, 1954 |
| 2,683,254 | Anderson et al. | July 6, 1954 |
| 2,751,275 | Mansberg | June 19, 1956 |
| 2,765,455 | Meiners | Oct. 2, 1956 |
| 2,769,683 | Skelton | Nov. 6, 1956 |
| 2,779,428 | Silverman | Jan. 29, 1957 |
| 2,803,515 | Begun et al. | Aug. 20, 1957 |
| 2,825,885 | Reynolds | Mar. 4, 1958 |